July 8, 1941.  P. LANGEVIN  2,248,870
PIEZOELECTRIC SIGNALING APPARATUS
Filed June 21, 1920
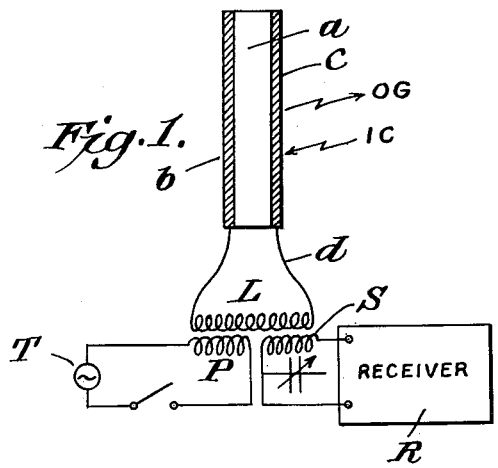
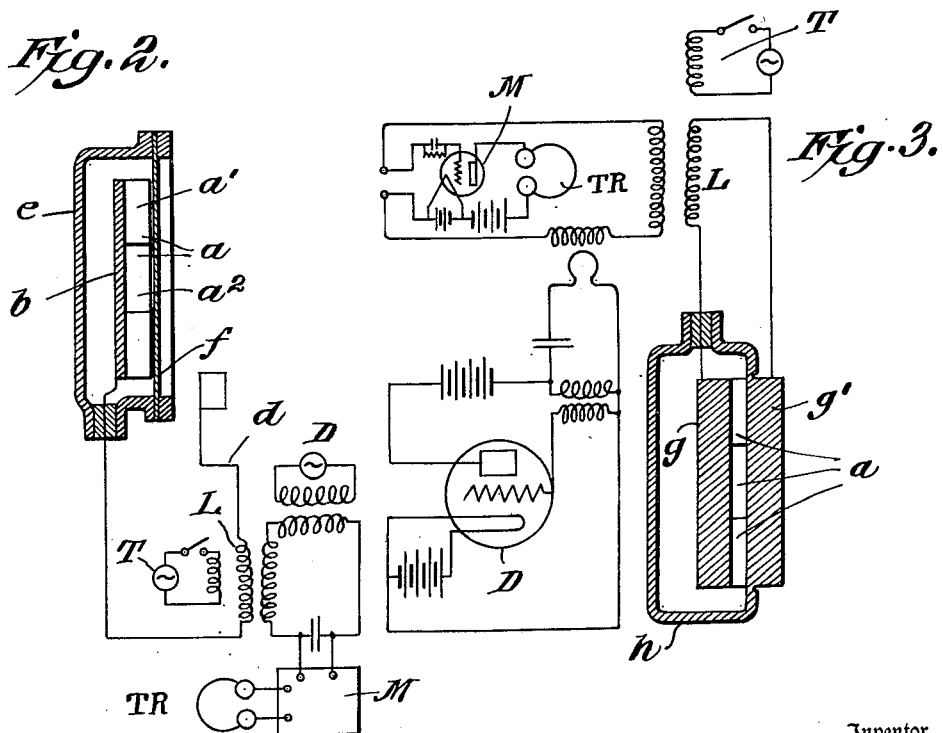
Inventor
Paul Langevin,
By Maurot Lewis
Attorneys Patented July 8, 1941

2,248,870

UNITED STATES PATENT OFFICE 2,248,870

PIEZOELECTRIC SIGNALING APPARATUS

Paul Langevin, Paris, France, assignor, by mesne assignments, to Mauro and Lewis, Washington, D. C., a firm composed of Philip Mauro and Reeve Lewis Application June 21, 1920, Serial No. 390,542

18 Claims. (Cl. 177—386)

In Patent No. 1,471,547, granted Oct. 23, 1923, in the names of Chilowsky and the applicant, an apparatus has been described by which the directive emission and reception of elastic waves of high frequency in water are obtained by means of electric oscillations and applications of these means for secret and directed submarine signaling, for detecting submarines and submarine mines and for protecting vessels against reefs, sandbanks, icebergs and collisions of any kind by utilising the echo produced or the shadow thrown by the obstacle to be detected.

The apparatus described utilises electrostatic or magnetic attractions in order to set into synchronous vibration a surface of which the dimensions must be as much larger in relation to the length of the elastic waves as the opening for the emitted beam is smaller.

The present invention consists in means which attain the same object by utilising the piezoelectric properties of quartz in order to obtain the transformation of electric oscillations of given frequency into elastic waves of the same frequency and vice-versa.

The works of P. and J. Curie have shown that the compression of a crystal of quartz in the direction of a binary axis produces an electric polarisation in this direction, and that inversely the establishment of an electric field in this direction is accompanied by a parallel contraction or dilatation according to the direction of the field.

The accompanying drawing shows examples of means for utilising this property.

Figs. 1, 2 and 3 show in transverse section three examples of a transmitting and receiving station.

A plate of quartz $a$ having its faces perpendicular to the binary axis of a crystal is placed between the conducting armatures or coatings $b$ and $c$ so as to constitute a condenser forming part of oscillating electric circuit $d$ containing the secondary coil L (Fig. 1). The production of electric oscillations in this circuit by any known means such as the transmitting oscillator T suitably coupled to the inductance L as by a primary coil P will be accompanied by synchronous contractions and dilatations of the plate of quartz capable of emitting in the water elastic waves OG of the same frequency. Inversely, the incident elastic waves IC, will set in vibration the plate of quartz, and the alternating electric polarization which results from this act as an electromotive force in the condenser to set up in the oscillating circuit electric oscillations which are easily detected by the known methods of wireless telegraphy as by the use of a receiver R of any known construction, suitably connected with the circuit $d$ as by a secondary coupling coil S. The same apparatus can thus serve indifferently as a transmitter or as a receiver of elastic waves of high frequency in the water. The smallness of the amplitudes corresponding to the propagation in the water of considerable energy under the form of elastic waves of high frequency is particularly adapted to the order of magnitude of the piezo-electric deformations of quartz and I have been able to obtain by this process emissions of elastic energy in water as high as 10 watts per square c/m.

The armature $c$ for example of the quartz plate condenser by which the emission is effected in water, can be omitted if the submarine emission or reception takes place in conducting salt water, which acts as the external plate of the condenser. The apparatus then takes the form shown in Fig. 2, in which $a$ is the plate of quartz cut perpendicularly to a binary axis, $b$ an insulated metallic plate forming the internal plate, and $f$ a thin sheet of mica or other insulating material cemented on its edges to ensure water-tightness, and fixed to the plate of quartz by the interposition of a very thin layer of resin, petroleum jelly, etc.

The internal face of the plate $b$ can be in contact either with an insulating liquid or with the interior air of the box $e$ which contains the condenser. In this latter case the emission of elastic waves will only take place on the side in contact with the water across the insulating sheet $f$. The operation of the apparatus shown in Fig. 2 is the same as that shown in Fig. 1.

The best conditions for the transformation of the electric waves into elastic waves and vice-versa are realised when the combination of the plate of quartz and the plate possesses in the direction of its thickness a natural period of compressional vibration equal to that of the generating electric oscillations for the emission, or to that of the incident compressional waves for the reception. This condition is realised when the combination represents a half-wave plate for the frequency used; that is to say, when the combination of the plates has a thickness equal to one-half the wave length corresponding to the frequency used. For example, let $e$ be the thickness and V the speed of propagation of the vibrations through the whole series of plates of the combination; and further let N be the frequency: then $$\lambda = \frac{V}{N}$$

The so-called half-wave plate is the one whereof the thickness $e$ is equal to $$\frac{\lambda}{2} = \frac{V}{2N}$$

For a given frequency of the alternating potential difference between the two metallic plates of the condenser the amplitude of the compressional waves emitted is a maximum when this condition of compressional resonance is realised. This condition, if the incident waves are parallel to the surface of the condenser, effects the complete absorption of the incident compressional energy without reflection or transmission of the waves, the compressional energy being completely converted into electric energy which can be used in the receiving circuit.

It is possible to obtain, from crystals of quartz that are available in large quantities, only plates of very restricted dimensions. Therefore it is necessary to constitute the plate $a$ of the condenser by placing together several plates having their binary axes parallel and in the same direction, obtaining in this way a mosaic as shown in Fig. 2 of which the elements $a^1$, $a^2$ etc. are joined by an insulating material (petroleum jelly, resin etc.), in order to avoid any leakage along the adjoining surfaces.

In order to diminish the quantity of quartz required and also to reduce the difference of potential necessary for the emission of a given power in the form of elastic waves, the quartz is, preferably, in the form of a thin plate (single or mosaic plate), the rest of the half-wave plate being formed by a metal (bronze, steel or aluminium). This construction is shown in Fig. 3.

The efficiency of the quartz from the piezo-electric point of view being a maximum in the nodal (central) region of the half-wave plate, the best arrangement consists in placing the plate of quartz between two metallic plates $g$, $g^1$ of equal thickness Fig. 3, joined to the quartz by a suitable cement, and such that the natural vibration of the whole in the direction of its thickness shall be in resonance with the exciting electric oscillation for emission or the ultra-audible incident wave for reception. One of the two metallic plates, for example $g^1$, can form the external armature of the condenser, with the surface which emits or receives the elastic waves in contact with the water, the other plate, $g$, which is insulated, constituting the internal armature of the condenser.

The insulated internal coating $g$ will have its face opposite to the quartz in contact with air, if we wish the elastic radiation to be emitted by one side only; or in contact with an insulating liquid, such as oil or petrol, if the emission is to take place by both faces of the condenser. The metallic plate $g^1$ constituting the external armature in contact with the water forms one of the faces of the box $h$ which encloses the condenser.

The example, shown in Figs. 2 and 3, of organization of apparatus and circuits suitable for the emission and the reception of the ultra-audible waves by means of the quartz condenser of the form described herein, comprises:

(a) A transmitting station for producing undamped electric oscillations of high frequency of an amplitude which is either constant, or is periodically varied by an alternator, arc, or oscillator lamp.

(b) The oscillating emission circuit $d$, comprising for example the secondary coil L and the quartz condenser, the latter having members necessary for supporting it and changing its direction from the horizontal to the vertical.

(c) The quartz condenser for reception, which may also be the condenser for emission, just as the same antenna for wireless telegraphy is utilized for both purposes.

(d) The receiving circuits which can also, at least partially serve for emission.

(e) A valve amplifier M analogous to those used in wireless telegraphy for telephonic reception, and a heterodyne generator D producing beats of audible frequency in the telephone receiver TR with the undamped oscillations which beats are received in said telephone after their amplification and detection by the valve amplifier.

The arrangement according to the invention can be used not only for the detection of objects under water and the transmission of signals through water, but also for medical and other uses of elastic waves of high frequency.

Having thus described the nature of the said invention and the best means I know of carrying the same into practical effect, I claim:

1. An electro-mechanical vibrator comprising a body adapted to vibrate mechanically when stimulated electrically and to respond electrically when vibrated mechanically, and an element having a natural period of vibration connected with the body, the parts being so designed that they shall vibrate as a unit at substantially the frequency of said natural period when the body is stimulated electrically.

2. An electro-mechanical vibrator comprising a piezo-electric body and an element having a natural period of vibration connected with the body, the parts being so designed that the body shall respond electrically when the parts are vibrated mechanically as a unit.

3. A piezo-electric device for emitting and receiving compressional waves of high frequency in water, said device comprising a crystal of quartz and a conducting plate having a natural period of vibration synchronous with that of said crystal attached to one side thereof, and a water-tight casing therefor which encloses said device on the side to which said plate is attached and exposes the opposite side to impingement of the incident compressional waves when said device is used in water.

4. A piezo-electric device for the emission and reception of compressional waves of high frequency, comprising a piezo element consisting of a plurality of quartz crystals having their binary axes parallel, and a vibratory conducting plate attached to said element in such manner that the device vibrates as a unit.

5. A piezo-electric device as specified in claim 4, in combination with an oscillating electric circuit.

6. A piezo-electric device for the emission and reception of compressional waves of high frequency, comprising a relatively thin plate of quartz having its faces perpendicular to a binary axis of the crystal, and relatively thick vibratory conducting plates cemented thereto, one on each side thereof, the whole forming a condenser having a natural period of vibration in the direction of its thickness approximately equal to that of the compressional waves to be emitted and received.

7. An electro-mechanical vibrator comprising a crystal of quartz and an element having a natural period of vibration attached thereto and forming therewith a vibratory unit.

8. In a signaling circuit adapted for use in systems of communication, a piezo-electric device comprising a quartz body having a pair of faces, an electrode associated with each of said faces and included in said circuit, and means including said electrodes for impressing an undulating signaling voltage on said body.

9. In combination, a piezo-electric device comprising a quartz body having a pair of faces, means for subjecting said body to a compressive force exerted across the faces of said body and which varies in accordance with an undulating signal wave, and a signaling circuit controlled in accordance with the resulting electrical response of said body and adapted for use in systems of communication.

10. A device for controlling a signaling circuit comprising a piezo-electric quartz body having a pair of faces, an electrode contacting one of said faces, and a second electrode spaced from and capacitively coupled to the other face of said body.

11. In combination, a piezo-electric device comprising a quartz body having a pair of faces, means for subjecting said body to a compressive force exerted across the faces thereof which force varies in accordance with sound waves to be reproduced, and a signaling circuit controlled in accordance with the resulting electrical response of said body and including means for detecting and reproducing said sound waves.

12. The combination set forth in claim 8, wherein the quartz body is composed of a mosaic of quartz crystals.

13. The combination set forth in claim 9, wherein the quartz body is composed of a mosaic of quartz crystals.

14. In an oscillatory circuit for producing oscillations of a substantially fixed frequency, a frequency determining device comprising a piezo-electric quartz body and at least one electrode contacting said body, said device having a vibrating dimension which bears a predetermined and substantially fixed relationship to the wave length corresponding to said fixed frequency.

15. In an oscillatory circuit for producing oscillations of a substantially fixed frequency, a frequency determining device comprising a piezo-electric quartz body and at least one electrode contacting said body, said device having a vibrating dimension approximately equal to one-half the wave length corresponding to said fixed frequency.

16. A high frequency oscillating circuit including a frequency determining element which comprises a pair of electrodes connected in said circuit, and a piezo-electric quartz crystal disposed between said electrodes.

17. A high frequency oscillating circuit including a frequency determining element which comprises a pair of electrodes connected in said circuit, and a piezo-electric quartz crystal disposed between said electrodes, said crystal having one face which contacts one of said electrodes and a second face capacitively coupled to the other of said electrodes.

18. In a system for transmitting super-audible sound waves through a sound conducting medium, a circuit including a piezo-electric quartz crystal, means for impressing an undulating voltage of said super-audible frequency on said circuit, and means controlled by vibration of said body for setting up corresponding waves in said medium.

PAUL LANGEVIN.